June 30, 1953   F. C. PARADISE   2,643,678
ADJUSTABLE STROKE LUBRICANT DISPENSING VALVE
Filed Sept. 16, 1949   3 Sheets-Sheet 1
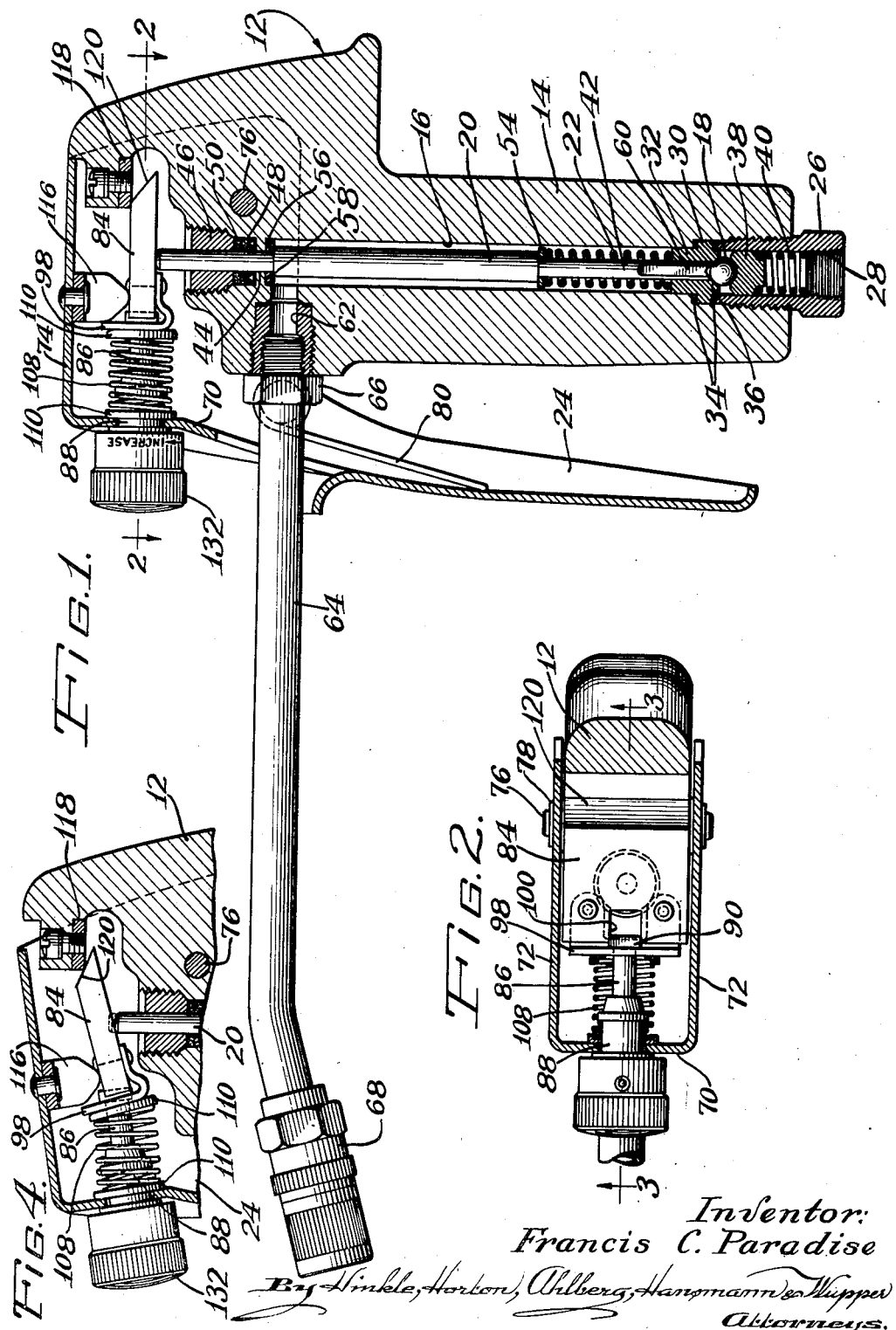
Inventor:
Francis C. Paradise
By Hinkle, Horton, Ahlberg, Hansmann & Wupper
Attorneys.

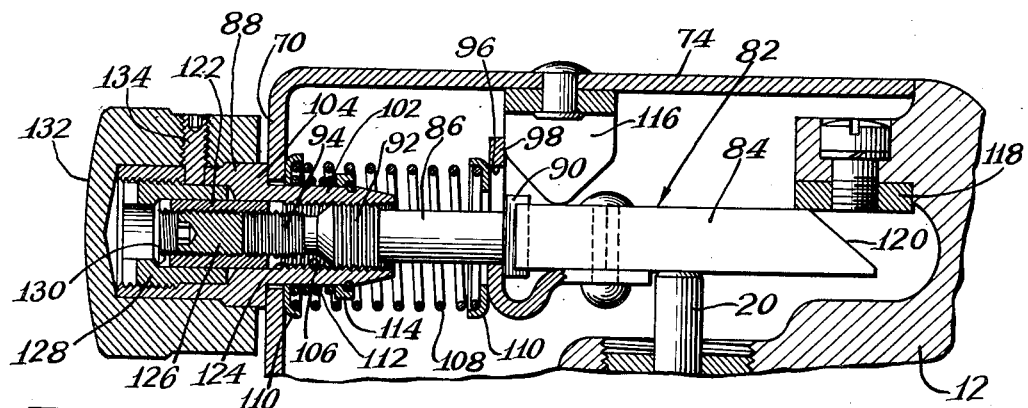
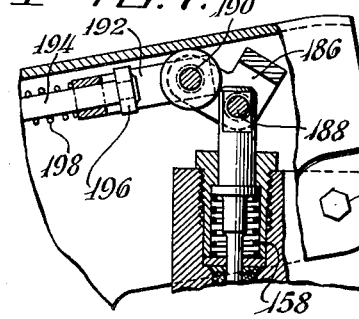
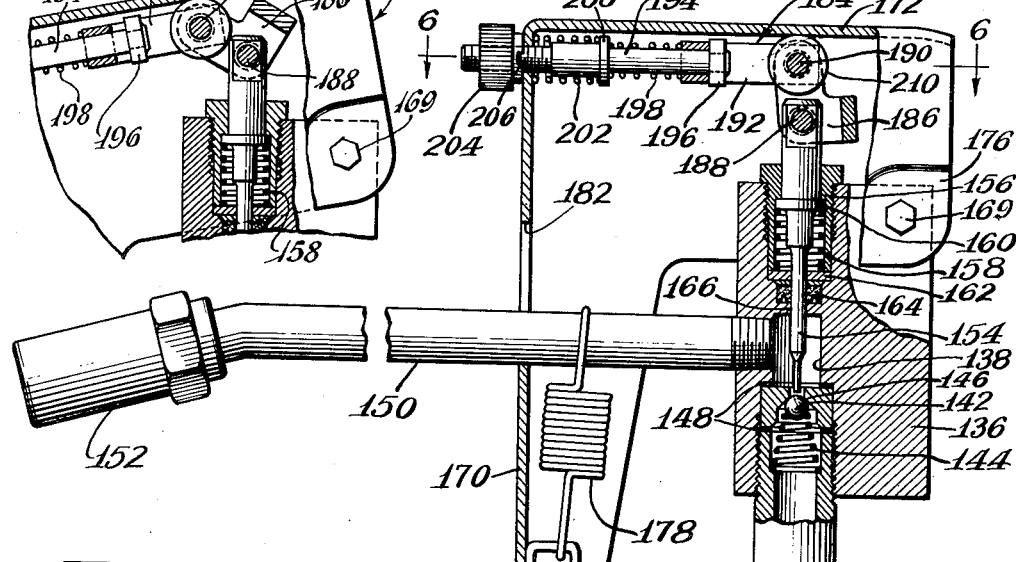
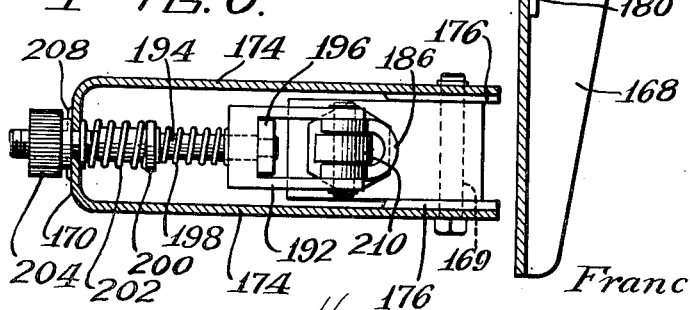

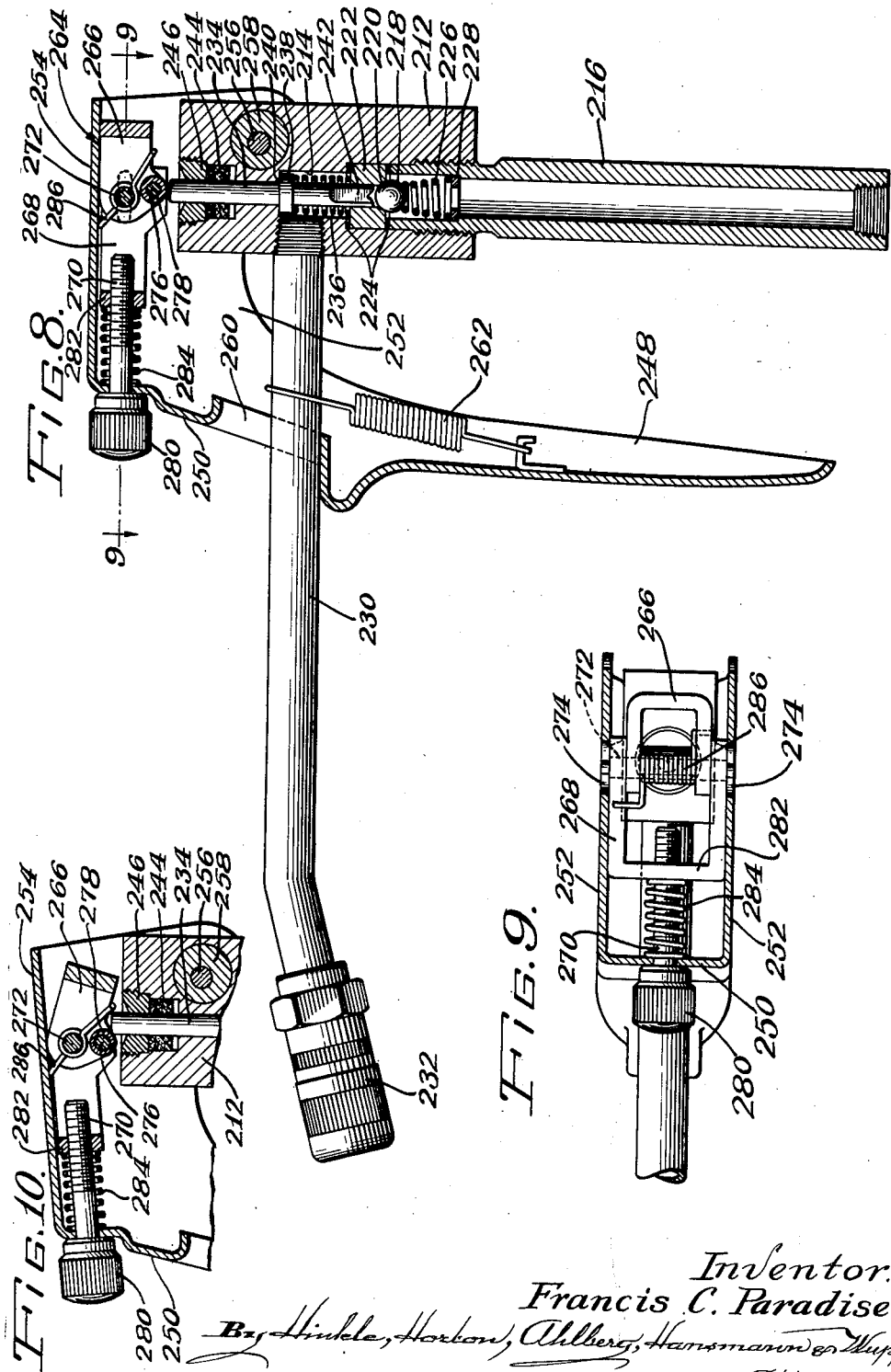

Patented June 30, 1953

2,643,678

UNITED STATES PATENT OFFICE 2,643,678

ADJUSTABLE STROKE LUBRICANT DISPENSING VALVE

Francis C. Paradise, Fox Lake, Ill., assignor to Stewart-Warner Corporation, Chicago, Ill., a corporation of Virginia Application September 16, 1949, Serial No. 115,985

15 Claims. (Cl. 137—749)

The present invention relates to lubricating apparatus and more particularly to a valve operable to dispense lubricant from a high pressure source in separate shots of substantially equal volume or in a continuous flow under the control of an operator.

Certain machinery such as automotive vehicles have a relatively large number of bearings periodically requiring relatively small charges of lubricant of substantially the same volume to lubricate the same, and other parts which require a relatively large volume of lubricant. The control valve of the present invention is designed especially for use in service stations for automotive vehicles or for lubrication of machinery of the above mentioned type and particularly where it may be desirable to vary the volume of the small charge from time to time.

Accordingly an object of the invention is to provide a new and improved control valve for a lubricant dispensing apparatus for dispensing lubricant in predetermined quantities or shots of relatively small and substantially equal volume upon successive operations of the valve.

Another object of the invention is to provide a new and improved control valve for lubricant dispensing apparatus which is adjustable to cause a substantially measured charge or shot of lubricant to be delivered each time the valve is operated or to cause a continuous flow of lubricant to be delivered.

A further object of the invention is to provide a new and improved control valve of the type set forth in the foregoing objects which is adjustable to vary the volume of the charges or shots delivered by the valve.

A still further object of the invention is to provide a new and improved control valve of the metering type for a lubricant dispensing apparatus which lends itself readily to manufacture by mass production methods so that it is inexpensive, but which nevertheless is durable, efficient and easily operated, and which may readily be disassembled and reassembled for inspection, cleaning and repair.

These and other objects, advantages and capabilities of the invention will become apparent from the following description in which reference is had to the accompanying drawing, wherein:

Fig. 1 is a vertical longitudinal sectional view of a control valve embodying the principles of the present invention;

Fig. 2 is a horizontal sectional view taken on the line 2—2 of Fig. 1;

Fig. 3 is a fragmentary vertical sectional view similar to Fig. 1 but on an enlarged scale showing the mechanism by means of which the volume of the shot dispensed by the control valve may be varied, the mechanism being in the position it assumes when the operating handle is at inoperative position;

Fig. 4 is a fragmentary sectional view similar to Fig. 1 showing the parts in the position they assume when the operating handle of the control valve is operated to cause a shot of lubricant to be disensed;

Fig. 5 is a vertical longitudinal sectional view of a modified form of control valve with the parts in the position they assume when the handle is at inoperative position;

Fig. 6 is a horizontal sectional view taken on the line 6—6 of Fig. 5;

Fig. 7 is a fragmentary sectional view similar to Fig. 5 but showing the operating mechanism in the position it assumes when the handle is operated to cause a shot of lubricant to be dispensed;

Fig. 8 is a vertical longitudinal sectional view of a further modification of the invention;

Fig. 9 is a horizontal sectional view taken on the line 9—9 of Fig. 8; and

Fig. 10 is a vertical sectional view similar to Fig. 8 but showing the plunger operating mechanism in the position it assumes when the handle is operated to cause a shot of lubricant to be dispensed.

The preferred embodiment of the invention disclosed in Figs. 1-4 comprises a body member 12 conformed to provide a pistol grip handle 14 and having a bore 16 of nonuniform diameter extending through the same to provide a passageway for the flow of lubricant. A normally closed check valve 18 in this passageway is opened by a plunger 20 biased to inoperative position by a return spring 22 and operated by a handle 24 in a direction to open the valve 18.

Lubricant is admitted to the bore 16 through a hollow fitting 26 (Fig. 1) threaded into the lower end of the bore. The fitting 26 is threaded internally adjacent its outer end as indicated at 28 to receive the outlet end of a supply conduit (not shown) through which lubricant under relatively high pressure may be supplied to the bore 16 from any suitable type lubricant pump. The inner end of this fitting engages a peripheral bead or flange 30 on a plunger guide member 32 and forces the flange into abutting engagement with a shoulder in the bore 16 fixedly to secure the guide member 32 in the bore. Copper gaskets 34 preferably are located on opposite sides of the flange 30 on guide member 32 to provide a fluidtight seal between the bore 16 and guide member 32.

The check valve 18 seats against a valve seat 36 formed on the underside of guide member 32. This valve, which may be of the ball type, rests upon a carrier 38 slidable in the fitting 26 and of polygonal shape to allow lubricant to flow past the same. A spring 40 reacting between the underside of the carrier 38 and a shoulder in the fitting 26 urges the carrier in a direction to seat the valve 18.

The valve operating plunger 20 has a reduced lower end 42 reciprocable in and guided by the guide member 32. At its upper end, which is also of reduced size, the plunger 20 is reciprocable in and guided by a portion 44 of the bore 16 of reduced diameter, and this end of the plunger is also guided by an apertured plug 46 threaded into the upper end of the bore 16. A lubricant-tight seal is provided at this end of the bore by packing compressed between the inner end of the plug 46 and a shoulder formed by the reduced portion 44 of the bore and including a synthetic rubber-like packing ring 48 of V-shape in cross-section, and a leather or like washer 50.

Plunger 20 is biased to elevated or inoperative position by the relatively heavy spring 22 confined between the inner end of the guide member 32 and a washer 54 abutting against a shoulder intermediate the ends of the plunger. Movement of the plunger under the influence of spring 22 is limited by a shoulder 56 adjacent the upper end of the plunger and a cooperating shoulder in the bore 16 formed by the reduced portion 44 thereof. Preferably the plunger is raised sufficiently when it is at inoperative position to lift its lower end at least $\frac{1}{32}$ inch above the check valve 18 so that the latter will seat firmly under the influence of spring 40 and a limited amount of lost motion will be provided between the plunger and the valve. The position to which the plunger is raised can be accurately controlled by means of a washer 58 upon the plunger between the shoulder 56 on the plunger and the reduced portion 44 in the bore 16.

Flattened areas 60 on the lower end of the plunger 20 allow lubricant to flow through the guide member 32 past the plunger when the check valve 18 is opened. This lubricant flows upwardly in the space between the plunger and bore 16 to an outlet passageway 62 in the body member 12 communicating with the bore 16 adjacent its upper end.

An outlet pipe 64 is secured in outlet passageway 62 by means of a bushing 66 threaded therein. On its outer end this pipe is provided with a coupler 68 for detachably connecting the control valve with a lubricant-receiving fitting attached to a part to receive lubricant.

Operating handle 24 has a front wall 70 and spaced side flanges 72 (Fig. 2) between which the upper end of body member 12 is received. These flanges are connected at their upper ends by an integral top wall 74 (Fig. 1). The handle 24 pivots upon the opposite ends of a pin 76 passing through the body member 12 on the rear side of the bore 16. Snap rings 78 (Fig. 2) on the opposite ends of this pin 76 hold the handle on the pin. To prevent binding between the sides of the handle and the body, the latter may be provided with flat bosses surrounding the aperture through which pin 76 extends, or other suitable means such as washers may be used to accomplish the same purpose. Return of the handle to inoperative position is assured by a relatively strong torsion spring 80 reacting between the body member and handle.

The plunger is moved in a direction to open valve 18 when the handle 24 is swung in a forward direction (toward body member 12 as seen in Fig. 1) by means indicated in its entirety by the number 82 in Fig. 3, including a flat breaker bar or thrust-transmitting latch member 84 connected to the handle 24 by an adjusting screw 86 and an adjustment member or bushing 88. The adjusting screw 86 has a head 90, an intermediate threaded part 92 of enlarged diameter, and reduced threaded tip 94. Screw 86 passes loosely through a vertically elongated aperture 96 in a vertical flange on a bracket 98 riveted or otherwise suitably fixed to the forward end of the latch member 84. Aperture 96 includes a portion at its upper end large enough to pass the enlarged part 92 of the body of the screw but not its head 90. A notch 100 in the forward end of latch member 84 (Fig. 2) receives the head of the screw to hold the same against turning.

The adjustment member 88 has a reduced portion 102 (Fig. 3) on one end which projects loosely through an aperture in the front wall 70 of the operating handle, and a shoulder 104 to engage this front wall and limit inward movement of the adjustment member. The enlarged part 92 of the adjusting screw 86 is threaded into the threaded part of a bore 106 extending through the adjustment member to connect the screw and adjustment member and thus connect the latch member 84 to the operating handle 24.

The latch member 84 is urged away from the front wall 70 of the handle by a coil spring 108 reacting between a pair of dished spring retainers 110, one of which abuts against the front flange on bracket 98, and the other of which abuts against the inner side of the front wall 70 of the handle. Since the shoulder 104 on the adjustment member 88 limits inward movement of the same, and since the spring 108 is under compression at all positions of adjustment of the adjustment member 88 relative to the screw 86, rotational adjustment of this member upon the screw will cause the latch member 84 to be moved forwardly, or backwardly relative to the front wall of the handle, depending on the direction the adjustment member is turned.

A second spring 112 reacting between the front spring retainer 110, and a spring retainer 114 secured on the inner end of the reduced part 102 of the adjustment member 88 by means of a spring clip, more or less rigidly holds the adjustment member 88 and adjusting screw 86 at a fixed position relative to the handle. In other words the adjustment member is urged inwardly of the handle by spring 112 to hold its shoulder 104 in abutting engagement with the front wall 70 of the handle at all times.

Adjacent its forward end the opposite sides of the latch member 84 are engaged by a fulcrum member 116 riveted or otherwise suitably fixed to the top wall 74 of the handle. On the rear end of the body member 12 a horizontally extending breaker strip or fulcrum 118 is fixedly secured. This breaker strip cooperates with the fulcrum 116 on the handle to hold the latch member 84 in fixed position relative to the handle and in operative engagement with the upper end of the plunger when the handle is at inoperative position.

This strip also cooperates with an obtusely inclined free rear end 120 on the latch member 84 to release the latter for fulcruming on the fulcrum member 116 at a predetermined point in the forward stroke of the handle under the influence of the thrust exerted on its underside by plunger return spring 22 through the plunger 20 so that the latter is freed for return to inoperative position. By adjusting the latch member in an endwise direction, the point in the stroke of the handle at which the plunger is released can be varied and thus the amount of lubricant dispensed by the valve during each operation of the handle can be varied. In order to provide adjustability within a desired range, the parts, by means of which the plunger is operated from the handle, must be assembled in a definite manner which will now be described.

In assembling the control valve, the adjustment member 88 (Fig. 3) and adjusting screw 86 are first adjusted relatively to a position at which a continuous thrust will be exerted on the plunger 20 by the latch member 84 throughout the stroke of the handle 24 irrespective of how far it is moved in a forward direction. This occurs when the latch member 84 is moved to a position to the right of that shown in Fig. 3. An internally threaded bearing sleeve 122 which fits relatively loosely in the unthreaded intermediate part of bore 106 in the adjustment member 88 is then threaded upon the reduced end 94 of the adjusting screw 86 until its inner end engages a shoulder 124 at the inner end of the threaded portion of bore 106. It is locked in this position by screwing an externally threaded plug 126 into its outer end and into abutting engagement with the end of the adjusting screw 86.

Thereafter the adjustment member 88 is turned in a clockwise direction until the latch member 84 has been moved to the left far enough so that an operating thrust of minimum duration will be exerted on the plunger 20 when the handle 24 is operated before the latch member is released. The duration of this thrust can be varied as desired by adjusting the latch member 84 a greater or lesser distance to the left. In Fig. 3 the latch member is shown at a position of adjustment which will give a shot of minimum volume.

After this adjustment has been made, a bushing 128 which engages over the bearing sleeve 122 is threaded into the threaded outer end of an enlarged bore in the outer end of the adjustment member 88 until an internal shoulder 130 in the bushing lightly engages the outer end of bearing sleeve 122. An adjusting knob 132 having a knurled outer surface and indicia thereon to indicate the direction of rotation for increasing or decreasing the volume of the shot dispensed by the valve, is then slipped over the outer end of the adjustment member 88. This knob is locked in position by a set screw 134 extending radially through the knob and adjustment member and into abutting engagement with the bushing 128. The knob 132, adjustment member 88, and bushing 128 are thus locked together for movement as a unit.

By reason of the fact that the adjusting screw 86 and bearing sleeve 122 move as a unit in an endwise direction relative to the adjustment member 88 when it is turned by means of the knob 122, the shoulders 124 and 130 cooperating with the opposite ends of the bearing sleeve 122 form stops to limit adjustment of the latch member 84 in either direction endwise. Normally four complete turns of the knob 132 are sufficient to move the latch member from one limit in its range of movement to the other.

Operation of the dispensing valve to deliver a predetermined shot of lubricant will first be described, it being assumed that the knob 132 has been set at the proper position to give the desired shot. When the handle 24 is rocked toward the body member 12, the parts attached to the handle including the adjustment member 88 and adjusting screw 86 are moved as a unit, arcuately forwardly and downwardly, and thus draw the latch member 84 in the same direction. Due to the fact that the thrust of the plunger return spring 22 is operative against the underside of latch member 84 through plunger 20, the latch member is held against the breaker strip fulcrum 118 and fulcrums upon the same during initial movement of the handle. This depresses plunger 20 in opposition to its return spring 22, opening valve 18 in opposition to its closing spring 40 and in opposition to the pressure of the lubricant at the inlet so that lubricant flows to discharge pipe 64.

However, at a predetermined point in the forward stroke of the handle 24 depending on the setting of the knob 132, the latch member 84 is drawn forward far enough to bring its inclined free end 120 into engagement with the outer edge of the breaker strip fulcrum 118. The inclination of this rear end 120 is such as thereupon to free the latch member for rocking movement relative to its connection with the adjusting screw 86 as illustrated in Fig. 4. The plunger return spring 22 acting through plunger 20 exerts a sufficient upward thrust on the underside of latch member 84 to rock or fulcrum it upon the front fulcrum 116 far enough to allow the plunger to return to inoperative position. Consequently the check valve 18 closes so that the flow of lubricant to discharge pipe 64 is discontinued.

Throughout the movement of the handle 24 the adjustment member 88 and adjusting screw 86 are held in a plane normal to the front wall 70 of the handle and in extended position relative thereto by the spring 112. Since the connection between the latch member 84 and adjusting screw 86 allows considerable rocking and endwise movement to occur between these parts, once the inclined end 120 of the latch member is brought into engagement with the breaker strip fulcrum 118, the handle may be moved through a complete forward stroke without causing the latch member further to operate the plunger.

Upon release of the handle 24, the torsion spring 80 returns the same to inoperative position. Until just prior to the time the handle reaches inoperative position, the latch member 84 remains in the rocked position shown in Fig. 4 due to the fact that its inclined rear edge 120 is wedged against the breaker strip 118 as a result of the combined effect of the thrust exerted on its forward end by the spring 108, and the thrust exerted on its underside by the plunger return spring 22 acting through the plunger. Furthermore since the fulcrum member 116 on the handle is moved arcuately upwardly and rearwardly on return movement of the handle, it is carried rearwardly along the top side of the latch member at an angle corresponding to the angle of inclination of the latch member and thus cooperates with the plunger 20 and spring 22 in holding the latch member in rocked position throughout the return stroke of the handle. During this return movement the adjacent member 88 and adjusting screw 86 are carried arcuately upwardly and rearwardly relative to the wedged latch member due to the fact that they are held in fixed position relative to the handle by the inner spring 112, the outer spring 108 yielding to allow the adjusting screw to return with the handle, and the latch member to remain in rocked position.

As the handle 24 approaches inoperative position, the front fulcrum 116 is carried to a position substantially in the plane of the breaker strip fulcrum 118 and thereupon the thrust of spring 108 snaps the latch member 84 back into operative position.

As the latch member 84 is progressively adjusted to the right of the position shown in Fig. 3, the shot dispensed when the handle 24 is operated progressively becomes of longer duration and, therefore, of greater volume. At its extreme righthand position of adjustment, the latch member cannot be drawn far enough forward by forward movement of the handle 24 to bring its inclined rear end 120 into engagement with breaker strip 118, irrespective of how far the handle is operated. The check valve 18, therefore, is held open as long as handle 24 is out of operative position so that a continuous flow of lubricant of any desired duration may, therefore, be produced at this setting of the adjustment member.

The form of the invention disclosed in Figs. 5-7 includes a body member 136 (Fig. 5) having a bore 138, the diameter of which varies along its length. Lubricant is admitted to this bore through a pipe handle 140 threaded into the lower end of the bore and connected to any suitable source of lubricant under relatively high pressure such as a conventional lubricant compressor. A ball check valve 142 controls flow of lubricant from the pipe handle 140 into bore 138. This valve is urged by a spring 144 into engagement with a seat 146 in a valve seat forming member held in position against a shoulder in the bore 138 by the inner end of pipe handle 140. Gaskets 148 of suitable material are provided to prevent leakage between the valve seat forming member and bore 138.

A discharge pipe 150 having a coupler 152 on its outer end for making quick detachable connection with a lubricant-receiving fitting of conventional form is threaded into the body member 136 and communicates with the bore 138.

Valve 142 is moved to open position by a plunger 154 reciprocable in a tubular fitting 156 threaded into the enlarged upper end of bore 138. A plunger return spring 158 housed in fitting 156 and confined between a flange 160 on the plunger, and a metal washer 162 held against a shoulder in bore 138 by the inner end of fitting 156, urges the plunger to inoperative position.

The metal washer 162 also serves to hold in position packing 164 between the bore and plunger forming a fluidtight seal around the plunger and including a synthetic rubber-like sealing ring and a leather washer surrounding the plunger. Movement of the plunger is guided by the fitting 156 and washer 162 and by a reduced portion 166 in the bore 138 through which the plunger passes.

The plunger is operated by a handle 168 of generally U-shape in cross-section (Fig. 6) pivotally secured to the body member 136 by means of a pin 169 suitably held in position. The handle has a front wall 170, top wall 172 and side walls 174. To prevent binding between the sides of the handle and the body member 136, the side walls 174 preferably are provided with embossed flat portions 176 to space the sides from the sides of the body member, although other means may be used to prevent binding such as washers.

A tension spring 178 (Fig. 5) having one end hooked to the discharge pipe 150 is secured at its other end to a hook 180 on the front wall 170 of the handle and urges the handle to the inoperative position shown in Fig. 5. It will be noted that the front wall 170 of the handle is provided with a vertically elongated aperture 182 through which pipe 150 extends. The opposite ends of this aperture engaging discharge pipe 150 determine the limits of movement of the handle.

Referring to Figs. 5 and 7, it will be seen that the plunger 154 is operatively connected to the handle 168 by linkage indicated in its entirety by the number 184. This linkage includes a generally bell crank shaped floating link 186 having its intermediate part pivotally secured to the upper end of plunger 154 by means of a pivot pin 188 and its upper end pivotally connected by means of a pin 190 to the rear end of a generally U-shaped link or yoke 192. The latter is connected to the front wall 170 of the handle by means of an adjusting pin or screw 194 passing freely through an aperture in the front wall of handle.

Adjacent its rear end, this pin 194 passes freely through the front end of link 192 and the latter is urged to extended position relative to the pin and into abutting engagement with a nut 196 suitably locked on the rear end of the pin by a spring 198 confined between a shoulder 200 on the adjusting pin 194 and the front side of link 192. A second spring 202 of greater resistance than spring 198 confined between the shoulder 200 and the front side 170 of the handle urges the pin and link to extended position relative to the front wall of the handle.

The pin 194 is adjustable in an endwise direction relative to the handle by means of an adjusting nut 204 threaded on its outer end and engaging the outer side of the front wall 170 of the handle to thus limit movement of the pin 194 under the influence of spring 202. The nut 204 may have a knurled periphery and its rear side has a diametrically extending groove 206 (Fig. 5) which engages diametrically opposite embossed projections 208 (Fig. 6) in the front wall 170 of the handle along the periphery of the opening through which the pin passes. The spring 202 holds nut 204 against the front side of the handle and the projections engaging in groove 206 lock the nut at adjusted position.

A roller 210 is pivotally secured upon the pin 190 between the arms of link 186 (Figs. 5 and 6). This roller engages the top wall 172 of the handle to facilitate movement of the link or yoke 192 in an endwise direction relative to the handle. Such movement occurs when the link is being adjusted or when the handle is operated, as will be described later.

From the above description of the construction of the control valve disclosed in Figs. 5-7, it will be apparent that the handle 168, linkage 184, and plunger 154 are normally urged to the inoperative position shown in Fig. 5 by the various springs connected thereto, while the check valve 142 is held in closed position by the spring 144 and the pressure of the lubricant thereon. At this position of the parts, the axis of the common pivot pin 190 interconnecting the link 186 and yoke 192 is on the axis of the plunger 154 or slightly to the left of the plunger axis as seen in Fig. 5, depending on whether the control valve is set to provide a continuous flow of lubricant or to deliver a single shot of lubricant when the handle is operated. In Fig. 5 the linkage 184 is set to cause a relatively large shot to be delivered when the handle is operated.

When the handle 168 is rocked forwardly toward the body 136, the yoke 192 moves with the handle due to the fact that it is connected thereto by the adjusting screw 194. This rocks the common pivot pin 190 in the same direction. As a result, link 186 is rocked on its connection 188 with the plunger 154 and initially is depressed sufficiently to cause the plunger 154 to open valve 142. Lubricant thereupon flows from the pipe handle 140 to the discharge pipe 150.

However, when the common axis 190 is rocked forward to a predetermined point over center relative to the axis of plunger 154, the upward thrust exerted upon the linkage 184 by the plunger return spring 158, and to a lesser extent the thrust exerted by the spring 144, are sufficient to cause the link 192 to be forced forward on the adjusting pin 194 against the resistance of the spring 198 as shown in Fig. 7. This releases the plunger 154 for return to inoperative position by the spring 158 allowing valve 142 to close. Flow of lubricant to the discharge pipe 150 is thus cut off irrespective of whether or not the handle is moved further in its forward stroke because the spring 198 will continue to yield during any further forward movement of the handle.

When the handle 168 is released, the spring 178 returns the same to the inoperative position shown in Fig. 5. During this return movement, the common axis 190 between the links 186 and yoke 192 is moved upwardly and backwardly. The loose connection between the adjusting pin 194 and yoke 192 permits such lost motion as is necessary to allow yoke 192 to be returned to its initial position while the plunger is in inoperative position, and the tension in the spring 198 insures return of the yoke to initial position as the handle returns to inoperative position.

To insure proper operation of the control valve, spring 202 should exert a greater thrust on the adjusting pin 194 than spring 198 so that the adjusting pin is always held at extended position relative to the front wall 170 of the handle. This insures that the plunger 154 will always be released at the same point in the forward stroke of the handle for a particular setting of the adjusting nut 204.

From the description of the operation of the control valve it will be apparent that the length of time the valve is held open during a forward stroke of the handle 168 can be decreased by turning the adjusting nut 204 in a direction to move the adjusting pin to the left, as seen in Fig. 5, and can be increased by turning the adjusting nut in a direction to move the adjusting pin to the right. At the extreme right-hand position of adjustment of the pin 194, the common pivot 190 in the linkage 184 cannot be carried forward far enough during the forward stroke of the handle to bring it to the point at which the link 186 will rock relative to the yoke 192 as a result of the force exerted thereon by the plunger and thus the latter will not be released even though the handle is moved to the limit of its forward stroke. At this setting lubricant will flow continuously while the handle is in operated position.

The adjusting nut 204 is locked at adjusted position due to the fact that its groove 206 engages the locking projections 208 (Fig. 6) on the front wall of the handle and is held in this position by spring 202. It is also to be noted that during movement of the yoke 192 relative to adjusting pin 194, the roller 210 tends to reduce friction between the linkage and the handle.

The third modification of the invention includes a body member 212 having a bore 214 of nonuniform diameter extending through the same. Lubricant is admitted to the bore 214 through a pipe handle 216 threaded at one end into the lower end of the bore 214 and connected at its other end to the discharge conduit (not shown) of any suitable lubricant pump supplying lubricant at constant pressure.

Flow of lubricant through the bore 214 is controlled by a ball check valve 218 which seats against a valve seat 220 formed in a guide member 222 held in position against a shoulder in bore 214 by the inner end of pipe handle 216. Preferably copper gaskets 224 are provided to form a fluidtight seal between the valve seat forming member and bore 214. The valve 218 is urged to closed position by coil spring 226 confined between the ball valve 218 and a washer 228 resting upon a shoulder in the pipe handle 216.

Lubricant is discharged from the bore 214 through a discharge pipe 230 threaded into the body member 212 and communicating at one end with an intermediate part of bore 214. On its outer end the discharge pipe has a coupler 232 of conventional construction for making detachable connection with a lubricant-receiving fitting connected to a part requiring lubrication.

Check valve 218 is opened by means of a valve operating plunger 234 normally urged to inoperative position by a spring 236 confined between the inner end of guide member 222 and a ridge or flange 238 on the plunger 234. This flange engages a shoulder 240 in the bore 214 to limit movement of the plunger under the influence of spring 236.

The lower end of plunger 234 reciprocates in a relatively close fitting bore in the guide member 222 and has chordal flattened areas 242 past which the lubricant flows when the valve 218 is open. Preferably the plunger 234 is retracted far enough by spring 236 to lift its tip out of engagement with the check valve 218 when the plunger is in inoperative position so that the plunger does not interfere with closing of the valve.

The upper end of the plunger 234 is guided by a reduced portion of the bore 214. A fluidtight seal is formed between the upper end of the plunger and this bore by packing 244 including a synthetic rubber-like sealing ring and a leather washer surrounding the plunger and held in the enlarged upper end of bore 214 by means of a plug 246 threaded into this end of the bore.

The plunger 234 is operated by a handle 248 which has a front wall 250 (Fig. 9), side flanges 252, and a top wall 254 (Fig. 8). This handle is pivotally secured upon a pin 256 extending through the body 212 at the rear side of the bore 214 and held in position by any suitable means. Preferably this pin is mounted eccentrically relative to a bushing 258 which may be rotatably adjusted relative to the body member 212 when the control valve is being assembled for adjusting the position of the handle relative to the body member so that play between the operating parts may be taken up readily. Suitable means may be provided to prevent binding between the body member and sides of the handle.

The front wall 250 of the handle has a vertically elongated flanged aperture 260 through which the discharge pipe 230 extends, and the ends of which determine the limits of movement of the handle 248. Preferably a spring 262 is provided to bias the handle to inoperative position.

Handle 248 and the upper end of plunger 234 are operatively connected by linkage indicated in its entirety by the number 264 including rear and front generally U-shaped yokes 266 and 268, respectively (Fig. 9), and an adjusting screw 270 passing freely through an aperture in the front wall of the handle and threaded into the forward end of the forward adjusting yoke 268. Yokes 266 and 268 are pivotally interconnected by pin 272, the outer ends of which ride in horizontal slots 274 (Fig. 9) in the flanges 252 on the handle. Secured upon a pin 276 (Fig. 8) carried by the arms of link 266 is a roller 278 which is free to rotate on this pin.

The adjusting screw 270 which has a knurled knob 280 on its outer end for engaging the outer side of the front wall 250 of the handle, is threaded at its inner end into a web 282 connecting the opposite sides of front yoke 268 thus to form a connection between the front side of the handle and the yokes 266 and 268. A spring 284 on the screw 270 biases the yoke toward the rear side of the handle carrying the pin 272 toward the rear of slots 274 and the roller 278 toward the rear edge of the plunger 234.

Wound upon the pin 272 is a torsion spring 286. This spring reacts between the top wall 254 of the handle and the lower edge of the yoke 266, and urges the free end of the latter into engagement with the top wall of the handle so that the roller 278 is held in engagement with the top end of plunger 234 when the handle 248 is in the inoperative position shown in Fig. 8.

The body member 212 and pipe handle 216 form a handle for the control valve by means of which it may be grasped. Assuming the knob 280 has been set to produce a shot rather than a continuous flow in order to operate the valve, the handle 248 is pivoted toward the body member 212. Since the linkage 264 pivots with the handle upon the axis of pin 256, the roller 278 is moved arcuately forwardly and downwardly relative to the inoperative position shown in Fig. 8, thus forcing the plunger down and opening valve 218 so that lubricant flows past the same into the discharge pipe 230.

When the parts are in inoperative position the axis of the roller 278 is substantially normal to the axis of the plunger and somewhat to the rear of the axis of the pin 272 interconnecting yokes 266 and 268. Furthermore, the yoke 266 is held in locked position against the upper wall of the handle by the torsion spring 286. When the handle 248 is rocked forwardly from this position, the axis of roller 278 and pin 272 are moved forward relative to the axis of the plunger 234. As the roller reaches the forward edge of the plunger 234, the wedging effect of plunger 234 on the roller resulting from the force of the springs 226 and 236 tending to return plunger 234, overcomes the force of torsion spring 286 tending to hold the yoke 266 in locked position. This wedging effect is sufficient to rock the yoke 266 clockwise, as seen in Fig. 10, thereby breaking the driving connection between the plunger 234 and handle 248 so that the plunger returns to inoperative position irrespective of how much further the handle is rocked forward. Thereupon the check valve 218 closes, discontinuing the flow of lubricant to the discharge pipe 230.

The tension in spring 262 is sufficient to return the handle to inoperative position when it is released, in spite of the fact that the roller remains wedged against the front edge of the plunger during this return movement. Because of this, the yoke 266 is rocked further in a counterclockwise direction against the resistance of torsion spring 286 as the handle returns to inoperative position. When the handle reaches inoperative position, the lower side of roller 278 is brought into the plane of the upper end of plunger 234, and the spring 286 thereupon rocks yoke 266 counterclockwise to bring the roller 278 back into operative relation with the upper end of the plunger thus resetting the control valve to deliver another shot of lubricant.

By adjusting the screw 270 in a direction to draw the linkage 264 forwardly (to the left in Fig. 8), the size of the shot delivered each time the handle is operated will be reduced, whereas, when the linkage is adjusted to the right, the size of the shot is increased, sufficient freedom for adjustment being provided to allow the linkage 264 and roller 278 to move far enough in a rearward direction so that the roller will not be moved to the forward edge of the plunger 234, irrespective of how far the handle 248 is operated. A flow of lubricant which continues for as long as the handle is out of inoperative position may thus be dispensed from the control valve.

It is to be noted that in all forms of the invention the plungers preferably are lifted high enough when they are in inoperative position so that their lower ends are spaced approximately $\frac{3}{32}$ inch above the check valves. No interference with tight closing of these valves, therefore, arises from this source.

In the normal operation of the control valve set to deliver a predetermined shot of lubricant, opening of the valve for the same interval of time each time the handle is operated, so that shots of substantially equal volume are dispensed upon successive operations of the handle, is assured due to the fact that the pressure of the lubricant, which is relatively high, offers considerable resistance to opening of the check valves when they are in closed position. Because of the relatively large force which must be applied initially to the handle to overcome this resistance and the instantaneous reduction in resistance to movement of the handle which follows opening of the valve, the handle will complete its forward stroke with a snap action, once the check valve opens. This insures operation of the handle through a complete stroke whenever it is operated far enough to open the check valve in the body of the control member. Because of this snap action the plunger completes its movement in substantially the same time each time the handle is operated so that the valve will be held open for substantially the same interval each time the handle is operated and thus will cause shots of substantially the same volume to be dispensed upon successive operations of the handle. It is also to be noted that as a result of the sudden reduction in resistance to movement of the handle incident to opening of the check valves that it is impossible to operate the handle only far enough to open the valve and then to hold the handle at this position. Consequently delivery of a single shot of a predetermined volume each time the handle is operated is insured when the control valve is set for that purpose.

From the foregoing description of the invention it will be noted that an improved control valve has been provided which may be set to deliver a single shot of lubricant each time it is operated, or to provide a flow of lubricant which continues for as long as the handle is held in operated position. Furthermore, the valve may readily be adjusted for continuous flow or single shot delivery, and the adjusting means includes means for varying the volume of the shot delivered by the valve when it is set for one shot operation.

While I have shown and described preferred embodiments of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. A lubricant control valve comprising a body member having a passageway therein with an outlet adapted to be connected to a part to be lubricated and an inlet adapted to be connected to a source of lubricant, a check valve to prevent flow of lubricant through said passageway, an operating handle, a valve operating plunger, means to operate said plunger for opening said valve, and means to rock said operating means in a plunger operating direction when said handle is operated including means relative to which said plunger operating means is movable to inoperative position, means including spring means to oppose movement of said plunger operating means to inoperative position, a connection between the handle and the spring means and plunger operating means simultaneously to move the latter in a direction to operate said plunger and to shift the position of the same and said spring relative to the plunger, and means to bias said plunger for return movement effective upon predetermined movement of the plunger operating means and spring relative to the handle to move said plunger operating means to inoperative position in opposition to said spring and thereby to release said plunger for return to inoperative position.

2. A lubricant dispensing valve comprising a body member having a lubricant passageway therein with an outlet adapted to be connected to a part to be lubricated and an inlet adapted to be connected to a source of lubricant under pressure, a check valve to prevent flow of lubricant through said passageway, resilient means biasing the check valve to close the latter, a valve operating plunger biased to inoperative position, an operating handle, means to establish an operative driving connection between the handle and the plunger for moving the latter in a direction to open said valve when said handle is operated including delayed action means to release said plunger for return to inoperative position during the stroke of said handle, and means to adjust the point in the stroke of said handle at which said delayed action means becomes effective to release the plunger to vary the length of time said valve is held open during a complete stroke of the handle.

3. A lubricant dispensing valve comprising a body member having a passageway therein with an outlet adapted to be connected to a part to be lubricated and an inlet adapted to be connected to a source of lubricant, a check valve to prevent flow of lubricant through said passageway, a valve operating plunger, an operating handle, means to establish a driving connection between the handle and plunger including means rockable relative to said handle to break the drivng connection with said plunger, and means to lock said rockable means against such rocking movement during a portion of the stroke of the handle, means on the handle to move said rockable means and locking means relatively in response to movement of said handle to release the rockable means for rocking movement relative to the handle at a predetermined point in the plunger operating stroke of the handle for breaking the driving connection to the plunger.

4. A lubricant dispensing valve comprising a body member having a passageway therein with an outlet adapted to be connected to a part to be lubricated and an inlet adapted to be connected to a source of lubricant, a check valve to prevent flow of lubricant through said passageway, a valve operating plunger, an operating handle, means to establish a driving connection between the handle and plunger including means rockable relative to said handle to break the driving connection with said plunger, means to lock said rockable means against such rocking movement, said rockable means and locking means being movable relatively in response to movement of said handle to release the rockable means for rocking movement at a predetermined point in the plunger operating stroke of the handle, yieldable means effective through said plunger to rock said rockable means relative to said handle when the latter is moved to said predetermined point to release said plunger for return to inoperative position, yieldable means to bias said handle for return movement, and a spring to return said rockable means to its normal position when said handle returns to inoperative position.

5. A valve to control dispensation of lubricant or the like, comprising a body member having a lubricant passageway therein with a discharge outlet and an inlet for lubricant under pressure, a normally closed check valve in said passageway, a valve operating plunger, yieldable means to bias said plunger to inoperative position, an operating handle, a latch member adapted to extend across the axis of said plunger, fulcrum means to engage the latch member adjacent one of its ends, means on the other side of the axis of said plunger to cause said latch member to fulcrum on said fulcrum means in a direction to operate said plunger for opening said valve when the handle is operated, and cooperating surfaces on the fulcrum means and the end of the latch member engaged thereby brought into cooperative relation at a predetermined point in the movement of said handle to free said latch member for independent movement whereby said plunger is released for return to inoperative position.

6. A valve to control dispensation of lubricant or the like, comprising a body member having a lubricant passageway therein with a discharge outlet and an inlet for lubricant under pressure, a normally closed check valve in said passageway, a valve operating plunger, yieldable means to bias said plunger to inoperative position, an operating handle, a latch member adapted to extend across the axis of said plunger, means providing a fulcrum for one end of said latch member, means to cause said latch member to rock upon said fulcrum and operate said plunger to open said valve when the handle is operated, cooperating surfaces on said fulcrum means and the end of said latch member engaged thereby brought into cooperative engagement at a predetermined point in the forward movement of the handle to free said latch member for rocking movement relative to the handle and thereby to release said plunger for return to inoperative position, and means to effect relative adjustment between said fulcrum means and said latch member for varying the point in the stroke of said handle at which the latch member is released and thereby varying the period said valve is held open when the handle is operated.

7. A valve to control dispensation of lubricant or the like as defined in claim 6, wherein the latch member and fulcrum means have a range of relative adjustment sufficient at one limit to prevent said latch member from being freed for movement relative to said connection throughout the movement of the handle so that a continuous flow of lubricant will be dispensed during operation of the handle when the adjustable means is adjusted to said limit.

8. A valve to control dispensation of lubricant or the like, comprising a body member having a passageway therein with a discharge outlet and an inlet for lubricant under pressure, a normally closed check valve in said passageway, a valve operating plunger, yieldable means to bias said plunger to inoperative position, an operating handle, a latch member adapted to extend across the axis of said plunger, means providing a fulcrum for one end of said latch member, means engageable with the other end of said latch member to cause said latch member to rock upon said fulcrum and operate said plunger when the handle is rocked in a forward direction and to move endwise relative to the fulcrum, cooperating surfaces on said fulcrum means and the free end of said latch member brought into cooperative relation at a predetermined point in the forward movement of said handle, at least one of said surfaces being inclined in a direction to free said latch member for independent rocking movement whereby said plunger is released for return to inoperative position, said cooperating surfaces cooperating when the handle moves in a return direction to wedge said latch member in rocked position, and yieldable means energized when said handle moves in a return direction to snap said latch member into operative position as the handle reaches inoperative position.

9. A valve to control dispensation of lubricant or the like, comprising a body member having a passageway therein with an outlet and an inlet for lubricant under pressure, a normally closed check valve in said passageway, a plunger to open said valve, a rockable operating handle, a pair of links pivotally interconnected at one of their ends, one of said links being pivotally connected at its other end to said plunger, a lost motion connection between the other end of the second of said links and said handle for moving the common axis laterally and axially relative to the axis of the plunger when the handle is rocked to cause said plunger to be operated, and means to bias said plunger for return movement effective through said plunger to cause lost motion to occur between said linkage and connection sufficient to release said plunger for return to inoperative position when the common axis is moved to a predetermined lateral position.

10. A valve to control dispensation of lubricant or the like, comprising a body member having a passageway therein with an outlet and an inlet for lubricant under pressure, a normally closed check valve in said passageway, a plunger to open said valve, a rockable operating handle, a pair of links pivotally interconnected at one of their ends, one of said links being pivotally connected at its other end to said plunger, a lost motion connection between the other end of the second of said links and said handle for moving the common axis laterally and axially relative to the axis of the plunger when the handle is rocked for causing said plunger to be operated, means to bias said plunger for return movement effective through the plunger to cause lost motion to occur between said linkage and connection sufficient to release said plunger for return to inoperative position, and means to adjust said links to vary the position of said common axis laterally relative to the axis of the plunger and thereby to vary the point in the stroke of said handle at which lost motion occurs between the links and the connection with said handle.

11. A valve to control dispensation of lubricant or the like, comprising a body member having a passageway therein with an outlet and an inlet for lubricant under pressure, a normally closed check valve in said passageway, a plunger to open said valve, a rockable operating handle, a pair of links pivotally interconnected at one of their ends, one of said links being pivotally connected at its other end to said plunger, means to connect the other end of the second link to said handle including means normally holding said linkage in operative relation with the plunger effective to move said common axis in a direction to cause an operating thrust to be imparted to said plunger when the handle is rocked in a forward direction and to cause the position of said common axis to be shifted laterally relative to the plunger, means to bias said plunger for return movement effective when the common axis of said linkage is moved to a predetermined lateral position by movement of the handle to move said linkage to inoperative position and release the plunger for return movement, and yieldable means energized by movement of said linkage to inoperative position to return the same to operative relation with the plunger when the handle is returned to inoperative position.

12. A valve to control dispensation of lubricant or the like, comprising a body member having a passageway therein with an outlet and an inlet for lubricant under pressure, a normally closed check valve in said passageway, a plunger to open said valve, a rockable operating handle, means to operate said plunger when said handle is rocked including linkage having a part engageable with said plunger, means forming a lost motion connection between said handle and linkage, spring means biasing said linkage in a direction to take up lost motion for rendering said connection effective to move the linkage in a direction to operate said plunger when the handle is rocked and to move the position of said linkage transversely relative to the plunger, and means to bias said plunger for return movement effective when the linkage is moved to a predetermined transverse position relative to the plunger to cause lost motion to occur between the linkage and handle whereby said plunger is released for return to inoperative position, said spring means taking up lost motion between the linkage and handle when the latter is returned to inoperative position.

13. A valve to control dispensation of lubricant or the like, comprising a body member having a passageway therein with an outlet and an inlet for lubricant under pressure, a normally closed check valve in said passageway, a plunger to open said valve, a rockable operating handle, a link rockable relative to said handle, means carried by said link operatively to engage said plunger when the link is at one position, yieldable means to bias said link to said position, and means connecting said link and handle for rocking said link with said handle to cause the means engaging said plunger to be moved axially when the handle is rocked and to move said plunger in a direction to open said valve and simultaneously to be moved transversely of the plunger, and means to bias said plunger for return movement effective when the means engaging said plunger is moved to a predetermined position transversely of the plunger to rock said link in opposition to its biasing means in a direction to release the plunger for return to inoperative position, said link biasing means being arranged to yield further while the link and the means engaging said plunger are moved toward operative position relative to said plunger by return movement of said handle.

14. A lubricant dispensing valve, comprising a body member having a passageway therein with an outlet adapted to be connected to a part to be lubricated and an inlet adapted to be connected to a source of lubricant, a check valve to prevent flow of lubricant through the passageway, a valve operating plunger to open the check valve, an operating handle rockable on the body member, a thrust member rockable into operative position between the handle and the plunger to operate the plunger when the handle is rocked, means to hold the thrust member in operative position during predetermined initial movement of the handle, means on the handle to move the thrust member transversely with respect to the plunger to condition the thrust member for rocking movement out of its operative position after predetermined further movement of the handle, and means biasing the plunger for return movement to rock the thrust member out of operative position after said further movement.

15. A valve to control the dispensing of lubricant or the like, comprising a body member having a passageway therein with an outlet and an inlet for lubricant under pressure, a check valve in the passageway, resilient means urging the check valve to closed position, a plunger to open the valve, an operating handle rockable on the body member, a thrust member to connect the plunger with the handle for operating the plunger to open the check valve during predetermined initial movement of the handle, means connecting the thrust member to the handle for moving the thrust member transversely in a predetermined direction with respect to the plunger to release the latter after predetermined further movement of the handle, and adjusting means on the handle to shift the last mentioned means transversely in a direction opposite the predetermined direction to provide continuous operation of the plunger during said further movement of the handle.

FRANCIS C. PARADISE.

References Cited in the file of this patent

UNITED STATES PATENTS

| Number | Name | Date |
| --- | --- | --- |
| 1,996,489 | Phillips | Apr. 2, 1935 |
| 2,397,103 | Haberstump | Mar. 26, 1946 |
| 2,399,147 | Schweisthal | Apr. 23, 1946 |